United States Patent
Soli

[15] 3,674,648
[45] July 4, 1972

[54] BACTERIAL LAMP

[72] Inventor: Giorgio Soli, China Lake, Calif.

[73] Assignee: The United States of America as represented by the Secretary of the Navy

[22] Filed: Feb. 1, 1971

[21] Appl. No.: 111,507

[52] U.S. Cl. ................................195/127, 240/2.25
[51] Int. Cl. .......................................................C12b 1/00
[58] Field of Search ..............240/2.25; 195/127, 103.5, 104

[56] References Cited

UNITED STATES PATENTS

| | | | |
|---|---|---|---|
| 3,567,586 | 3/1971 | Soli | 195/127 |
| 3,370,175 | 2/1968 | Jordon et al. | 195/103.5 |

*Primary Examiner*—Lionel M. Shapiro
*Assistant Examiner*—William Andrew Simons
*Attorney*—R. S. Sciascia and Roy Miller

[57] ABSTRACT

A bacterial lamp which produces a blue-green light which is particularly useful to divers to illuminate the immediate environment around them. The lamp comprises two vessels connected by valve means. One vessel is substantially filled with a bacteria culture medium and the other with a suspension of luminous bacteria in a non-nutrient medium. An oxygen bottle is connected by suitable means to the vessel containing the bacterial suspension and in operation gas pressure forces a predetermined amount of the bacterial suspension into the vessel containing the nutrient medium, whereupon the bacteria start to grow and a light output of considerable intensity is produced.

4 Claims, 2 Drawing Figures

PATENTED JUL 4 1972

3,674,648

INVENTOR.
GIORGIO SOLI
BY: ROY MILLER
ATTORNEY.

BACTERIAL LAMP

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to a bacterial light source, more particularly, it relates to a lamp based on luminous bacteria.

Research programs are being carried out in the biological field exploring the utility of certain species of bacteria which are capable of emitting visible light. Devices using luminous bacteria as a light source for human use, for example by divers, has been heretofore unfeasible because the light emitted by such bacteria under normal conditions, both in the natural environment and in the laboratory, is very low. The present invention is directed to a bacterial lamp using a new culture medium which greatly enhances the intensity of the light and sustains its output. The lamp provides a light source useful for divers who swim at depth in the ocean to illuminate the environment around them with a light which simulates the light of marine luminescent organisms. After initial costs, the lamp is inexpensive to operate and the exhausted lamps can be easily returned to the laboratory for refill. Such a light source provides an underwater light which does not use electricity as a power source and thereby avoids creation of a magnetic field as is the case with battery operated lamps.

DESCRIPTION OF THE INVENTION

Figure 1:
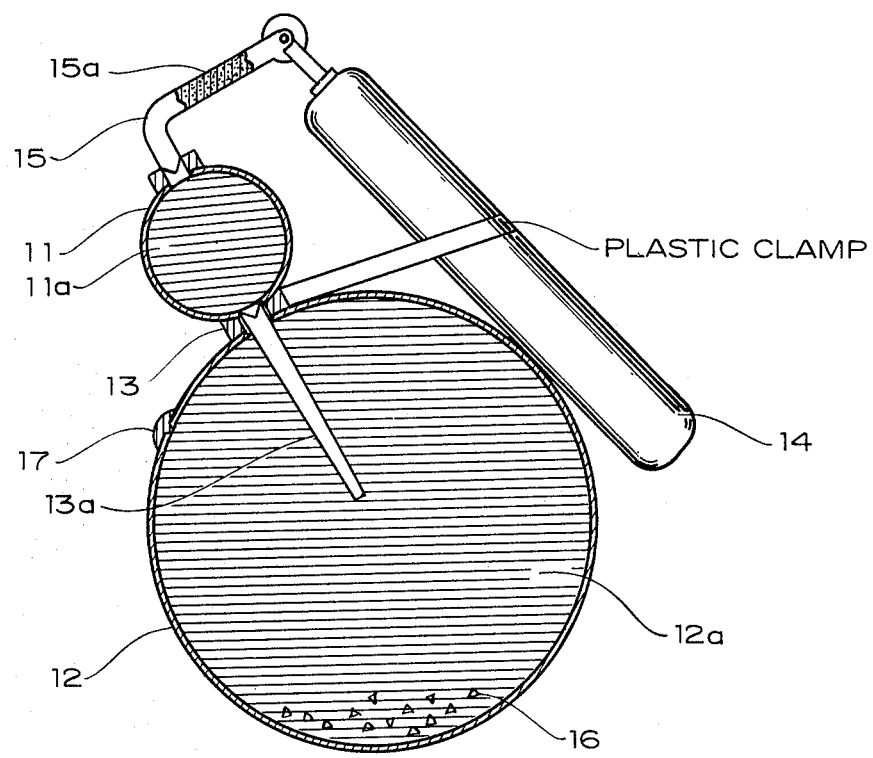
FIG. 1 is a view in section of a preferred embodiment of the operating bacterial lamp showing the liquid containing vessels in normal position.

Referring now to the drawings there is shown in FIG. 1 the bacterial lamp designated generally by numeral 10 which comprises a first vessel 11 and a second vessel 12 connected together by a first valve means 13. A gas cylinder 14 containing an oxygen mixture is affixed to the top of vessel 11 by a second valve means 15 which is provided with a bacterial size oxygen filter 15a which in operation allows oxygen to enter vessel 11 under controlled pressure. Vessel 11 is substantially filled with a liquid bacterial suspension 11a which comprises a non-nutrient medium inoculated with photobacteria. Vessel 12 is provided with marble chips 16 which cover the bottom of the vessel which is substantially filled with a liquid nutrient medium 12a. Vessel 11 used herein was a glass sphere provided with an opening at the bottom and top into which the valve means 13 and 15 respectively are positioned. Vessel 12 was also a glass sphere of larger volume than vessel 11 and was provided with two openings at the top into one of which valve means 13 was fitted and into the other a pressure relief valve designated at 17 was affixed.

In operation when second valve means 15 is actuated oxygen gas passes through filter 15a into first vessel 11. The pressure of the gas on bacterial suspension 11a forces a small amount of the suspension through first valve means 13 into vessel 12 which contains nutrient medium 12a. In about 12 hours the bacteria will have grown and started to emit light. Oxygen gas bubbled into vessel 11 enters vessel 12 through first valve means 13 at a very slow rate by adjusting valve 13, and will, because of the nature and composition of the nutrient medium 12a, sustain a light output of considerable intensity for at least a week, although light intensity starts gradually to diminish after a couple of days.

First valve means 13 is a suitable valve such as a discriminating or two-way valve. The liquid bacterial suspension passes through one portion and gas (oxygen) passes through the other portion. A glass or plastic tube 13a extends from first valve means 13 about midway into vessel 12. The tube serves as a carrier for the suspension and gas into liquid medium 12a.

Figure 2:
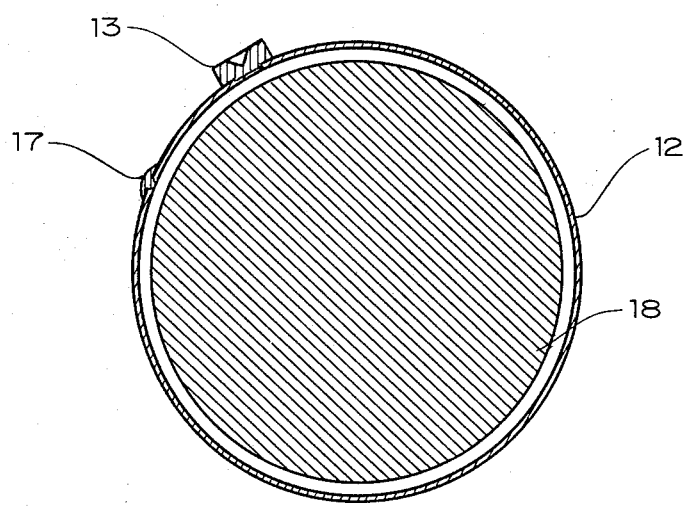
FIG. 2 is a section of another embodiment of the lamp wherein the larger vessel contains a solid medium in lieu of a liquid medium.

Another embodiment of second vessel 12 is shown in FIG. 2. In place of the liquid medium, a solid agar medium 18 is shown. A deflated balloon made of a suitable material such as fine nylon gauze is positioned within vessel 12 and filled with melted agar. After solidification, agar 18, has a diameter slightly smaller than second vessel 12 which allows bacterial growth on its outer surface after inoculation with the bacterial suspension 11a from the vessel 11 by the procedure described hereinabove.

In the present invention unbreakable glass spheres were used as vessels, the first vessel being smaller in size than the second vessel. The second vessel which must be made of an optically clear material may have a reflector on one side. The size and shape of the vessels may vary in accordance with the need; for example, the vessels could be in the configuration of a panel composed of clear plastic or other suitable material, provided with a chemostat whereby concentrated nutrient medium could be continuously dripped into the panel. In this configuration a stationary lamp would give off continuous light over a period of months simply with a few gallons, (3 or 4), of stored nutrient medium.

Luminescent bacteria offer an enormous advantage over luminescent chemicals because these bacterial manufacture their own luminescent chemicals out of relatively small amounts of nutrient material.

In the present invention a strain of luminous bacterium, originally isolated from dead fish, and identified as *Photobacterium phosphoreum* was used. Other luminous bacteria may be used but might require changes in the nutrient medium.

The non-nutrient suspension in which the photobacterium phosphoreum was stored and which was used in vessel 11 comprised the following ingredients:

| Ingredients | Amount | |
|---|---|---|
| Sodium chloride | 29.3 | gr |
| Magnesium chloride | 6.2 | gr |
| Sodium sulfate | 4.8 | gr |
| Calcium chloride | 0.7 | gr |
| Potassium chloride | 0.66 | gr |
| Sodium hydrogen carbonate | 0.03 | gr |
| Potassium bromide | 0.01 | gr |
| Ferric chloride | 0.002 | gr |
| Trace element solution* | 1 | ml |
| Distilled water | 1000 | ml |

*Trace element solution

| Ingredients | Amount | |
|---|---|---|
| Boric acid | 600 | mg |
| Sodium fluoride | 100 | mg |
| Lithium nitrate | 20 | mg |
| Manganese chloride | 20 | mg |
| Zinc sulfate | 5 | mg |
| Sodium metavanadate | 5 | mg |
| Potassium iodide | 5 | mg |
| Cobalt chloride | 1 | mg |
| Sodium molybdate | 1 | mg |
| Copper sulfate | 0.5 | mg |
| Distilled water | 100 | ml |

The liquid nutrient medium developed for use in the preferred embodiment consisted essentially of the following:

| Ingredients | Amount | |
|---|---|---|
| Sodium chloride | 29.3 | gr |
| Magnesium chloride | 6.2 | gr |
| Sodium sulfate | 4.8 | gr |
| Calcium chloride | 0.7 | gr |
| Potassium chloride | 0.66 | gr |
| Sodium hydrogen carbonate | 0.03 | gr |
| Potassium bromide | 0.01 | gr |
| Ferric chloride | 0.002 | gr |
| Peptone | 3.0 | gr |
| Galactose | 1.0 | gr |
| Sodium malate | 10.0 | gr |
| K glycerophosphate | 0.2 | gr |
| Vitamin solution No. 1* | 0.1 | ml |
| Vitamin solution No. 2** | 0.2 | ml |

| Ingredients | Amount | |
|---|---|---|
| Vitamin solution No. 3*** | 0.1 | ml |
| Distilled water | 1000 | ml |

*Vitamin solution No. 1

| Ingredients | Amount | |
|---|---|---|
| Thiamin | 50 | mg |
| Choline | 10 | mg |
| Nicotinic acid | 5 | mg |
| Nicotinamide | 2 | mg |
| Thymine | 5 | mg |
| Orotic Acid | 2 | mg |
| P-aminobenzoic acid | 2 | mg |
| Pyridoxine | 1 | mg |
| Riboflavin | 1 | mg |
| Distilled water | 100 | ml |

**Vitamin solution No. 2

| Ingredients | Amount | |
|---|---|---|
| Biotin | 1 | mg |
| Folic acid | 1 | mg |
| Distilled water | 100 | ml |

***Vitamin solution No. 3

| Ingredients | Amount | |
|---|---|---|
| Vitamin B12 | 1 | mg |
| Distilled water | 100 | ml |

The pH of the nutrient medium was adjusted to 7.5 with 0.1 M sodium hydroxide.

Marble chips of approximately one-twentieth of the volume of the liquid nutrient were placed on the bottom of vessel 12. The use of marble chips aids in keeping the pH fairly stable. Fluctuations of between 6.2 and 6.8 were noted over a 9-day incubation period. Growth and luminescence are enhanced, and the latter somewhat stabilized when the pH is kept closer to neutrality by the action of the marble chips. The chips do not interfere with the clarity of the medium.

Marble chips can be utilized over and over again simply by washing them with diluted sulfuric acid and rinsing them with distilled water.

Modification of the vessels includes adding material to make buoyant or to make then sink once the lamp has served its purpose. If the diver or user thereof does intend to reuse the lamp it can be refilled in the laboratory.

The present invention provides a non-beaming light and is of particular usefulness to underwater personnel for the following reasons:

1. It emits a blue-green color which can be seen at considerable distances in water in complete darkness;

2. It simulates the light of marine luminescent organisms, but at the same time it can be recognized by its users because of its shape, size and intensity;

3. It permits divers to keep in sight of each other;

4. Several lamps can be planted at intervals during an excursion by the divers out of a sea laboratory so that the divers can easily find their way back;

5. Certain objects at the bottom of the ocean can be marked by leaving the bacterial lamp of this invention on it; and 6. The light output of the photobacterium phosphoreum is enhanced both in intensity and duration at low temperatures so that excellent use of the present invention can be made in waters having a temperature of 10° C. or lower.

What is claimed is:

1. A bacterial lamp comprising
   a first vessel substantially filled with a non-nutrient suspension containing luminous bacteria;
   a second vessel composed of an optically clear material positioned adjacent said first vessel and substantially filled with a nutrient medium for said luminous bacteria;
   a first valve means operatively connecting the first vessel to the second vessel;
   a cylinder containing oxygen disposed adjacent the top of said first vessel;
   a second valve means operatively connecting said cylinder to said first vessel which means upon actuation releases oxygen from the cylinder into the first vessel thereby creating pressure which forces the suspension containing bacteria through the first valve means into the second vessel whereupon the bacteria start to grow in the medium contained in said vessel and emit light in the process.

2. The lamp in accordance with claim 1 wherein the bacteria is Photobacterium phosphoreum; the suspension comprises the following ingredients:

| Ingredients | Amount | |
|---|---|---|
| Sodium chloride | 29.3 | gr |
| Magnesium chloride | 6.2 | gr |
| Sodium sulfate | 4.8 | gr |
| Calcium chloride | 0.7 | gr |
| Potassium chloride | 0.66 | gr |
| Sodium hydrogen carbonate | 0.03 | gr |
| Potassium bromide | 0.01 | gr |
| Ferric chloride | 0.002 | gr |
| Trace element solution | 1 | ml |
| Distilled water | 1000 | ml | said trace element solution comprising

| Ingredients | Amount | |
|---|---|---|
| Boric acid | 600 | mg |
| Sodium fluoride | 100 | mg |
| Lithium nitrate | 20 | mg |
| Manganese chloride | 20 | mg |
| Zinc sulfate | 5 | mg |
| Sodium metavanadate | 5 | mg |
| Potassium iodide | 5 | mg |
| Cobalt chloride | 1 | mg |
| Sodium molybdate | 1 | mg |
| Copper sulfate | 0.5 | mg |
| Distilled water | 100 | ml | the nutrient medium comprises

| Ingredients | Amount | |
|---|---|---|
| Sodium chloride | 29.3 | gr |
| Magnesium chloride | 6.2 | gr |
| Sodium sulfate | 4.8 | gr |
| Calcium chloride | 0.7 | gr |
| Potassium chloride | 0.66 | gr |
| Sodium hydrogen carbonate | 0.03 | gr |
| Potassium bromide | 0.01 | gr |
| Ferric chloride | 0.002 | gr |
| Peptone | 3.0 | gr |
| Galactose | 1.0 | gr |
| Sodium malate | 10.0 | gr |
| K glycerophosphate | 0.2 | gr |
| Vitamin solution No. 1 | 0.1 | ml |
| Vitamin solution No. 2 | 0.2 | ml |
| Vitamin solution No. 3 | 0.1 | ml |
| Distilled water | 1000 | ml | said vitamin solution No. 1 comprising

| Ingredients | Amount | |
|---|---|---|
| Thiamin | 50 | mg |
| Choline | 10 | mg |
| Nicotinic acid | 5 | mg |
| Nicotinamide | 2 | mg |
| Thymine | 5 | mg |
| Orotic Acid | 2 | mg |
| P-aminobenzoic acid | 2 | mg |
| Pyridoxine | 1 | mg |
| Riboflavin | 1 | mg |
| Distilled water | 100 | ml | said vitamin solution No. 2 comprising

| Ingredients | Amount | |
|---|---|---|
| Biotin | 1 | mg |
| Folic acid | 1 | mg |
| Distilled water | 100 | ml; and | said vitamin solution No. 3 comprising

| Ingredients | Amount | |
|---|---|---|
| Vitamin B12 | 1 | mg |
| Distilled water | 100 | ml; and |

0.1 M sodium hydroxide in sufficient amount to adjust the pH to about 7.5.

3. The lamp in accordance with claim 2 wherein marble chips cover the bottom of said second vessel.

4. The lamp in accordance with claim 1 wherein the bacterium is photobacterium phosphoreum, the suspension comprises

| Ingredients | Amount | |
|---|---|---|
| Sodium chloride | 29.3 | gr |
| Magnesium chloride | 6.2 | gr |
| Sodium sulfate | 4.8 | gr |
| Calcium chloride | 0.7 | gr |
| Potassium chloride | 0.66 | gr |
| Sodium hydrogen carbonate | 0.03 | gr |
| Potassium bromide | 0.01 | gr |
| Ferric chloride | 0.002 | gr |
| Trace element solution | 1 | ml |

Distilled water 1000 ml; and
the nutrient medium is agar.